US012320480B2

(12) United States Patent
Huang et al.

(10) Patent No.: US 12,320,480 B2
(45) Date of Patent: Jun. 3, 2025

(54) ARTIFICIAL FLAME LUMINAIRE

(71) Applicant: XIAMEN GLOBALSELECTION IMP & EXP CO LTD, Xiamen (CN)

(72) Inventors: Kaiqin Huang, Xiamen (CN); Liangliang Li, Xiamen (CN)

(73) Assignee: XIAMEN GLOBALSELECTION IMP & EXP CO LTD, Xiamen (CN)

( * ) Notice: Subject to any disclaimer, the term of this patent is extended or adjusted under 35 U.S.C. 154(b) by 0 days.

(21) Appl. No.: 18/486,123

(22) Filed: Oct. 12, 2023

(65) Prior Publication Data

US 2025/0003563 A1 Jan. 2, 2025

(30) Foreign Application Priority Data

Jun. 30, 2023 (CN) ......................... 202321694202.1
Jun. 30, 2023 (CN) ......................... 202321699292.3

(51) Int. Cl.
*F21S 10/04* (2006.01)
*F21S 9/02* (2006.01)
*F21V 3/02* (2006.01)
*F21V 3/04* (2018.01)
*F21Y 115/10* (2016.01)

(52) U.S. Cl.
CPC ............... *F21S 10/043* (2013.01); *F21S 9/02* (2013.01); *F21V 3/02* (2013.01); *F21V 3/049* (2013.01); *F21Y 2115/10* (2016.08)

(58) Field of Classification Search
CPC .. F21S 10/043; F21S 9/02; F21V 3/02; F21V 3/049; F21Y 2115/10
USPC ..................................................... 362/249.02
See application file for complete search history.

(56) References Cited

U.S. PATENT DOCUMENTS

2014/0218903 A1* 8/2014 Sheng ..................... F21S 10/04 362/190
2016/0146414 A1* 5/2016 Dong ...................... F21S 6/001 362/372
2019/0063703 A1* 2/2019 Hurduc ................... F21V 14/06
2019/0101269 A1* 4/2019 Inayoshi ................ H05K 1/141

* cited by examiner

*Primary Examiner* — Elmito Breval
*Assistant Examiner* — Hana S Featherly
(74) *Attorney, Agent, or Firm* — Calfee, Halter & Griswold LLP

(57) ABSTRACT

The application discloses an artificial flame luminaire, comprising a light head, an encloser is provided around the light head, the light head includes a luminous body and a light head housing, the light head housing is provided to form an outer surface of the light head, the light head housing is provided with a chamber inside, the luminous body is installed in the chamber, there is a gap between the encloser and the light head, and the encloser and the light head housing cooperate to filter light from the luminous body. The advantages of this application are that the light head has a simple structure, small volume and convenient installation, which can cooperate with different bases to realize the simulated flame or flame effect, and the encloser has the function of blurred the solid outline of the light column, thus presenting a more rounded visual effect.

17 Claims, 6 Drawing Sheets

ARTIFICIAL FLAME LUMINAIRE

CROSS REFERENCE OF RELATED APPLICATION

The application claims priority to Chinese patent application No. 2023216942021 filed on Jun. 30, 2023, and the Chinese patent application No. 2023216992923 filed on Jun. 30, 2023, the entirety of which is incorporated in this article by reference.

TECHNICAL FIELD

The application relates to the technical field of lighting fixtures, and particularly relates to an artificial flame luminaire.

BACKGROUND

As a highly realistic flame emitting device, flame lamps are widely used in large banquets, streets, fashionable homes, and other places due to their lack of actual chemical components generated by combustibles, which does not pose any harm to human health or fire hazards. And because the design of the flame lamp is clever and lifelike, and the "flame" beats like real fire, it is used as decoration in many places and is favored by the public. During assembly, not only do the light source circuit boards need to be fixed separately, but they also need to be plugged one by one to connect the circuits, which is time-consuming, laborious, and costly, unable to meet production efficiency requirements.

Nowadays, candle lights are mostly formed by installing simple LED flame bulbs with their lamp holders, lacking the adjustability of the lighting, thus they cannot meet the use of different environments.

SUMMARY

The main purpose of the present application is to overcome the existing defects of artificial flame luminaires with limited structure and single shape, and propose an artificial flame luminaire, the light head has a simple structure, small volume and convenient installation, which can be coordinated with different bases to realize the simulated flame or flame effect.

In order to achieve the above purpose, the technical scheme taken by the present application is:

Provides an artificial flame luminaire comprising a light head, an encloser is provided around the light head, the light head comprises a luminous body and a light head housing, the light head housing is provided to form an outer surface of the light head, the light head housing is provided with a chamber inside, the luminous body is installed in the chamber, there is a gap between the encloser and the light head, and the encloser and the light head housing cooperate to filter light from the luminous body. The encloser fixed cover is provided in the periphery of the light head and there is a gap between the encloser and the light head, which has the function of blurred the solid outline of the light column, thus presenting a more rounded visual effect. This kind of artificial flame luminaire has few components, simple structure and convenient assembly.

In one possible realization, the light head housing is made of silicone or plastic material, and the light head housing has a light transmittance between 20% and 50% for visible light with a wavelength of 400 nm to 800 nm. The light head housing is used to eliminate the light spot effect of the light source to form a luminous area.

In one possible realization, the encloser is a light transmission material with translucent frosted or partial translucent frosted or with fog surface effect or partial fog surface effect, and translucent frosted or fog surface area of the encloser has a light transmittance between 40% and 80% for visible light with a wavelength of 400 nm-800 nm. The encloser can make the luminous effect of the LED element closer to the irregularity of the real flame, creating a more realistic visual effect, and 360-degree visibility.

In one possible realization, the light head housing has a single layer structure by integrally-forming, and the bottom of the light head is provided with a through hole communicated with the chamber. The structure of the integrated single layer can facilitate the uniform scattering of the whole light source, and the through hole can facilitate the connection of the luminescent body and the wire.

In one possible realization, the outer surface of the luminous body is provided with a scattering layer, and the scattering layer cooperates with the luminous body to filter light. The scattering layer is used to scatter the light from the luminous body, and the scattering layer scatters the light-emitting area, which can form a more uniform and soft light column effect.

In one possible realization, the top end of the encloser is provided with a cover, and the cover is sealed with the encloser. Through the setting of the cover, waterproof or dust resistance can be achieved.

In one possible realization, the top end of the encloser has an open structure. The hollow structure can facilitate the realization of multiple possibilities of products.

In one possible realization, the encloser is flame-shaped or cylindrical or round-table-like, and is made of plastic or silicone or glass. Through the setting of the encloser a variety of shapes, it has the effect of eliminating the luminous body contour, so that the light source is maximized to be soft and uniform, so that the luminous effect of the luminous body is closer to the irregular sense of the real flame, creating a more realistic visual effect, and 360-degree visibility.

In one possible realization, the luminous body is provided with at least one LED light group, and at least one LED light bead of each group of LED light group is connected in series through two wires. The LED element can emit light by connecting the power supply through two wires.

In one possible realization, the LED light group comprises a continuously shining LED light group and a blinking LED light group, the continuously shining LED light group is provided in the lower part of the luminous body, and the blinking LED light group is provided in the upper part of the luminous body. The continuously shining LED light group is provided in the lower part of the luminous body to simulate the effect of continuous combustion of the flame, and partially flashes to simulate the effect of irregular beating or swinging of the flame.

In one possible realization, the luminous body is provided with two LED light groups arranged in parallel, the positive electrodes of the two LED light groups are connected by one of the two wires, and the LED light beads on the two LED light groups have a staggered distribution. The luminous body is equipped with two sequential LED light groups, and the positive electrodes of LED light groups are connected by one of the two wires. By controlling the lighting, light ratio or brightness of each LED light group, a variety of combinations can be freely and flexibly arranged to meet the needs of different occasions. And there is no substrate occlusion, so that the LED lamp beads can be illuminated at 360 degrees. Moreover, the two LED light groups are arranged in parallel, that is, the positive and negative electrodes of the corresponding light group of the wire are negative-positive-negative from left to right, but the position of the LED light beads on the length of the wires on the respective LED light groups can be different, resulting in the arrangement of the light beads on the two light groups is staggered.

In one possible realization, the luminous body is provided with two LED light groups arranged in parallel, the negative electrodes of the two LED light groups are connected by one of the two wires, and the LED light beads on the two LED light groups have a staggered distribution. The luminous body is equipped with two sequential LED light groups, and the negative electrodes of LED light groups are connected by one of the two wires. By controlling the lighting, light ratio or brightness of each LED light group, a variety of combinations can be freely and flexibly arranged to meet the needs of different occasions. And there is no substrate occlusion, so that the LED lamp beads can be illuminated at 360 degrees. Moreover, the two LED light groups are arranged in parallel, that is, the positive and negative electrodes of the corresponding light group of the wire are positive-negative-positive from left to right, but the position of the LED light beads on the length of the wires on the respective LED light groups can be different, resulting in the arrangement of the light beads on the two light groups is staggered.

In one possible realization, the luminous body is provided with at least two LED light groups, each of the LED lamp groups is provided with at least one series of the LED light beads, the positive or negative electrodes of the adjacent LED light groups are connected by one of the two wires. The luminous body is provided with the setting of at least two LED light groups set in order, which can be freely and flexibly arranged to meet the needs of different occasions by controlling the lighting, off or brightness of each LED light group, and there is no substrate shielding, so that the LED lamp beads can be illuminated at 360 degrees. Moreover, the positive or negative electrodes of the adjacent LED light groups are connected by one of the two wires, that is, the positive and negative electrodes connected by the wires of the adjacent light groups are arranged in a symmetrical manner, and the electrodes connected by the wires on each side of the adjacent two light groups are the same electrode, and the other electrode is the common electrode of the adjacent two light groups.

In one possible realization, further comprising a base, one end of the base is provided with an inner shell, the inner shell is provided on the inside of the encloser, the inner shell and the light head are connected by a sleeve, the inner shell is provided with a connecting hole at one end near the luminous body, one end of the sleeve is inserted into the through hole, the other end of the sleeve is inserted into the connecting hole, and one end of the wire is electrically connected with the luminous body by through the sleeve. Through the setting of the base, it is easy to realize the characteristics of the whole device with few components, simple structure and convenient assembly. The sleeve protects the wire and enables the connection between the light head and the inner shell. One end of the sleeve is inserted into the through hole, which can make the light source glow like the wick of a candle, so as to improve the simulation of the whole luminaire like a flame. The sleeve and the through hole are closely coordinated to realize the circumferential fixation of the sleeve and the light head.

In one possible realization, the other end of the wire is connected to a PCBA circuit board, the lower part of the PCBA circuit board is connected with a battery compartment, the other end of the base is provided with a bottom cover, and the battery compartment is provided on the upper side of the bottom cover. The battery compartment provides power for the luminous body, the PCBA circuit board is used for controlling the light emitting and working state of the luminous body, and the bottom cover is used to support and protect the electrical components inside the inner shell.

In one possible realization, a sealing ring is provided between the bottom cover and the inner shell. The bottom cover is connected with a sealing ring to the inner shell, which can realize the internal waterproof to protect the battery compartment and prolong the service life of the battery.

In one possible realization, the bottom cover is provided with a switch mounting slot, the switch mounting slot is provided with a switch, and the switch is used for controlling the circuit of the luminous body on and off. The switch can slide in the switch mounting slot to control the on-off of the circuit, so as to control the light-on mode and off mode of the luminous body.

Compared with the prior art, the beneficial results of this application are:

1, In this application, there is a gap between the encloser and the light head, which has the function of blurred the solid outline of the light column, thus presenting a more rounded visual effect. The outer cover can make the luminous effect of the luminous body closer to the irregular sense of the real flame, creating a more realistic visual effect, and it is 360 degrees visible, and the outer cover structure is simple. It is easy to assemble and low-cost, and can cooperate with different bases;

2, In this application, the luminous body is equipped with at least one LED light group, which seals the scattering layer around the luminous body to make the light emitted by the LED components softer. This kind of artificial flame luminaire has few components, simple structure and convenient assembly.

3, In this application, the luminous body is provided with the setting of at least two LED light groups set in order, each of the LED lamp groups is provided with at least one series of the LED light beads, the positive or negative electrodes of the adjacent LED light groups are connected by one of the two wires, which can be freely and flexibly arranged to meet the needs of different occasions by controlling the lighting, off or brightness of each LED light group, and there is no substrate shielding, so that the LED lamp beads can be illuminated at 360 degrees.

4, In this application, the LED light group comprises a continuously shining LED light group and a blinking LED light group. The continuously shining LED light group is provided in the lower part of the luminous body to simulate the effect of continuous combustion of the flame, and partially flashes to simulate the effect of irregular beating or swinging of the flame.

BRIEF DESCRIPTION OF THE DRAWINGS

Comprising accompanying drawings to provide a further understanding of the embodiments and the drawings are incorporated into this specification and form part of this specification. The drawings illustrate the embodiments and are used in conjunction with the description to explain the principles of the present disclosure. Many expected advantages of other embodiments and embodiments will be easily understood because they are better understood by referring to the following detailed description. The elements in the attached drawings are not necessarily proportional to each other. The same attached marks refer to the corresponding similar parts.

The meaning of each number: 1—light head, 11—luminous body, 111—scattering layer, 112—LED light group, 1121—continuously shining LED light group, 1122—blinking LED light group, 1123—LED light bead, 12—light head housing, 121—chamber, 122—through hole, 23—wire, 2—encloser, 21—cover, 3—base, 31—inner shell, 311—connecting hole, 32—sleeve, 33—PCBA circuit board, 34—battery compartment, 35—seal ring, 36—switch, 361—switch mounting slot, 37—bottom cover.

DETAILED DESCRIPTION OF THE DISCLOSURE

In the following detailed description, the reference drawing forms part of a detailed description and is shown wherein an illustrative specific embodiment of the present application may be practiced. For this, refer to the orientation of the graph, such as "top", "bottom", "left", "right", "up", "down", etc. Since the components of the embodiment may be positioned in several different orientations, orientation terms are used for illustrated purposes and orientation terms are not limiting. It should be understood that other embodiments may be utilized or logical changes may be made without departing from the scope of this application. The following detailed description should not be adopted in the sense of limitation, and the scope of this application is limited by the attached claims.

Figure 1:
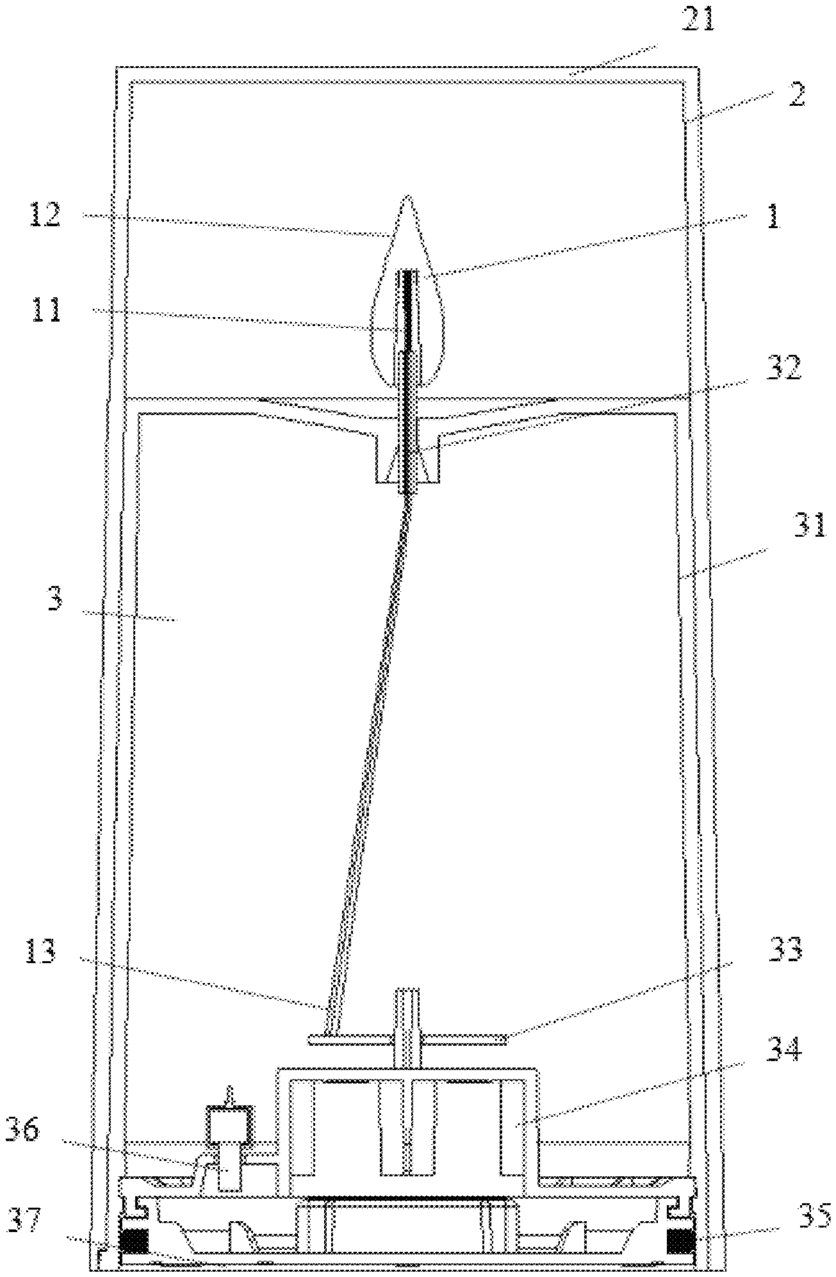
FIG. 1 is a cross-view of an artificial flame luminaire according to one embodiment of the present application.
Figure 2:
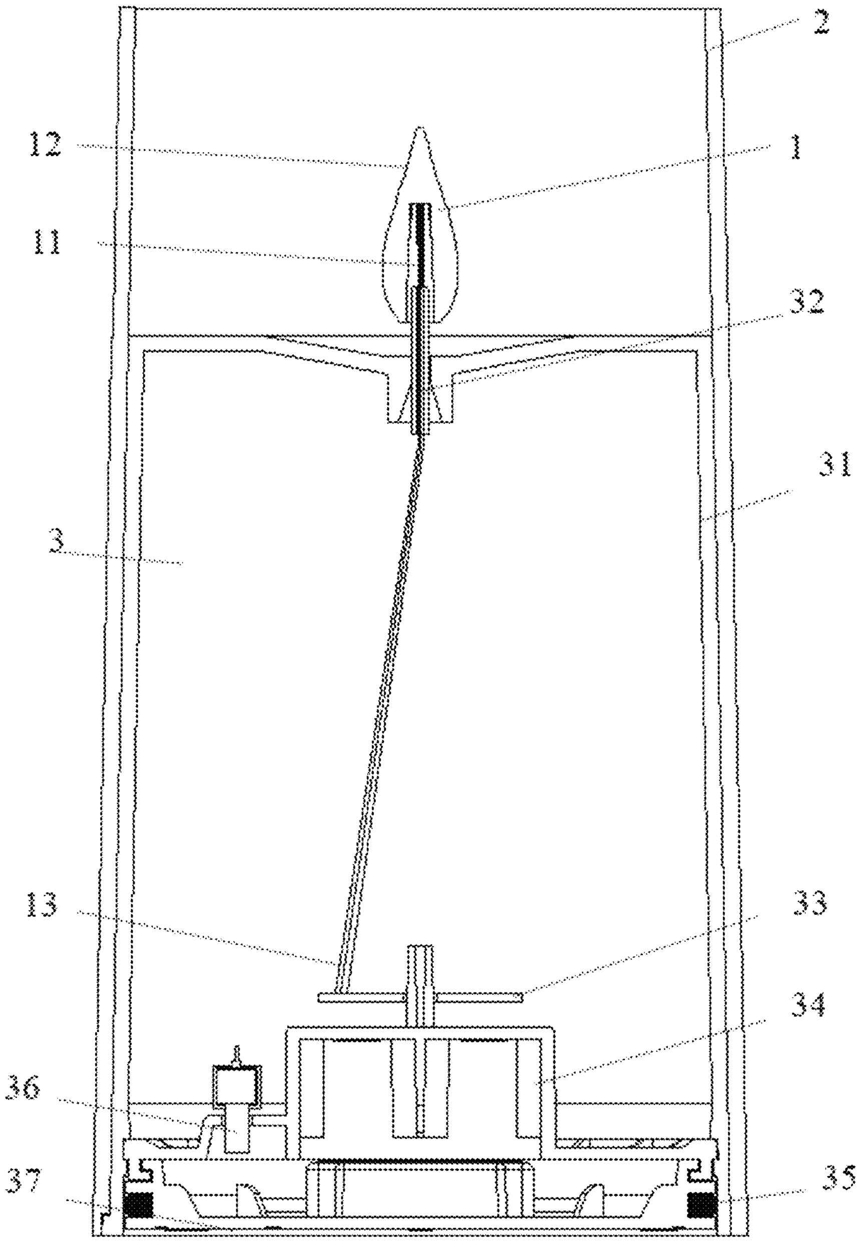
FIG. 2 is a sectional view of an artificial flame luminaire with an encloser but no cover according to an embodiment of the present application.
Figure 3:
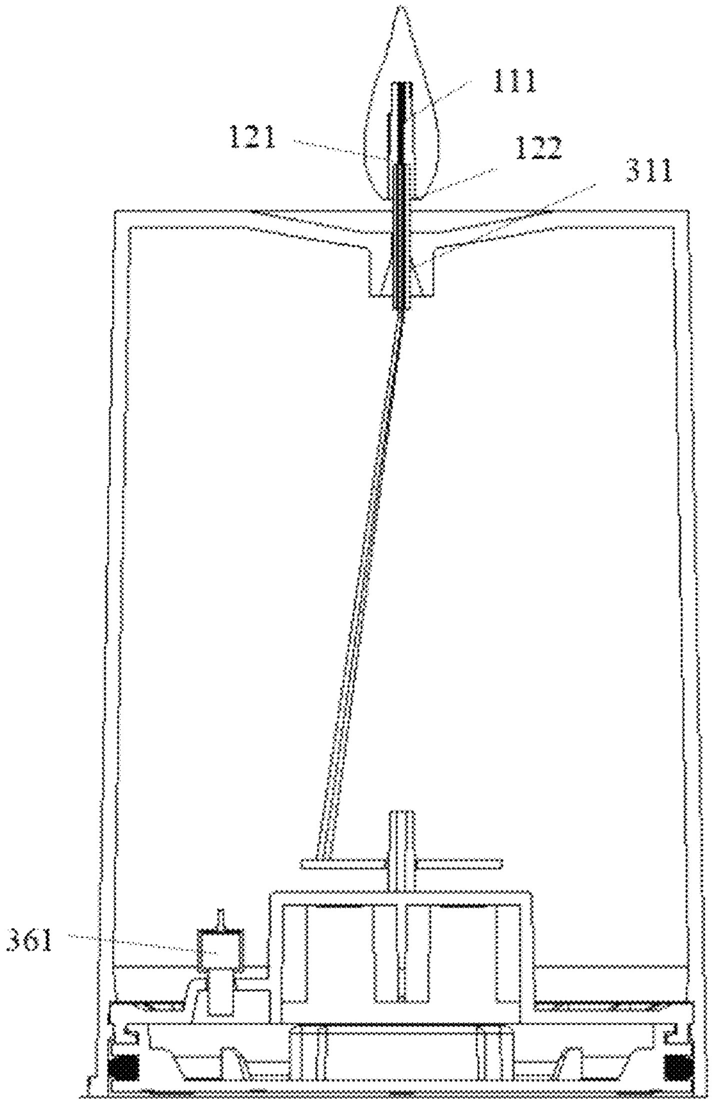
FIG. 3 is a partial section of an artificial flame luminaire according to a particular embodiment of the present application.

The present application provides an artificial flame luminaire, please refer to FIG. 1 to FIG. 3. The artificial flame luminaire comprising a light head 1, an encloser 2 is provided around the light head 1, the light head 1 comprises a luminous body 11 and a light head housing 12, the light head housing 12 is provided to form an outer surface of the light head 1, the light head housing 12 is provided with a chamber 121 inside, the luminous body 11 is installed in the chamber 121, there is a gap between the encloser 2 and the light head 1, and the encloser 2 and the light head housing 12 cooperate to filter light from the luminous body 11. The encloser 2 fixed cover is provided in the periphery of the light head 1 and there is a gap between the encloser 2 and the light head 1, which has the function of blurred the solid outline of the light column, thus presenting a more rounded visual effect. This kind of artificial flame luminaire has few components, simple structure and convenient assembly.

In a specific embodiment, the light head housing 12 is made of silicone or plastic material, and the light head housing 12 has a light transmittance between 20% and 50% for visible light with a wavelength of 400 nm to 800 nm. The light head housing 12 is used to eliminate the light spot effect of the light source to form a luminous area. It should be noted that the size requirement of the light transmittance of the light head housing 12 is related to the brightness of the light source and the distance between the light source and the encloser 2 with a frosted surface. The darker the brightness of the light source, the greater the light transmittance requirements; the greater the distance between the light source and the encloser 2, the greater the light transmittance requirements; that is, it is set according to the requirements of the actual product.

In a specific embodiment, the encloser 2 is a light transmission material with translucent frosted or partial translucent frosted or with fog surface effect or partial fog surface effect, and translucent frosted or fog surface area of the encloser 2 has a light transmittance between 40% and 80% for visible light with a wavelength of 400 nm-800 nm. The encloser 2 can make the luminous effect of the LED element closer to the irregularity of the real flame, creating a more realistic visual effect, and 360-degree visibility. It should be noted that the size requirement of the light transmittance of the translucent frosted or fog surface area of the encloser 2 is related to the brightness of the light source and the distance between the light source and the encloser 2 with a frosted surface. The darker the brightness of the light source, the greater the light transmittance requirements; the greater the distance between the light source and the encloser 2, the greater the light transmittance requirements; that is, it is set according to the requirements of the actual product.

In a specific embodiment, the light head housing 12 has a single layer structure by integrally-forming, and the bottom of the light head 1 is provided with a through hole 122 communicated with the chamber 121. The structure of the integrated single layer can facilitate the uniform scattering of the whole light source, and the through hole 122 can facilitate the connection of the luminescent body 11 and the wire 13.

In a specific embodiment, the outer surface of the luminous body 11 is provided with a scattering layer 111, and the scattering layer 111 cooperates with the luminous body 11 to filter light. The scattering layer 111 is used to scatter the light from the luminous body 11, and the scattering layer 111 scatters the light-emitting area, which can form a more uniform and soft light column effect. Specifically, the scattering layer is made of thick fog glue or other materials.

In other embodiments, according to the number of LED elements on the luminous body 11, the number of layers of the scattering layer 111 can be adjusted, which can be two or three or more layers, and the scattering layer 111 is sealed around the light-emitting body 11 to make the light emitted by the LED components softer.

In other embodiments, the outer surface of the luminous body 11 may not have a scattering layer 111, which can be set according to actual needs.

In a specific embodiment, the top end of the encloser 2 is provided with a cover 21, and the cover 21 is sealed with the encloser 2. Through the setting of the cover 21, waterproof or dust resistance can be achieved.

It should be noted that, further referring to FIG. 2, the top of the encloser 2 can be provided without the cover 21, that is, the top end of the encloser 2 has an open structure according to the actual requirements, and the hollow structure can facilitate the realization of multiple possibilities of products.

In the specific embodiment, the encloser 2 is flame-shaped or cylindrical or round-table-like or arc-shaped, and is made of plastic or silicone or glass or other materials. Through the setting of the encloser 2 a variety of shapes, it has the effect of eliminating the luminous body 11 contour, so that the light source is maximized to be soft and uniform, so that the luminous effect of the luminous body 11 is closer to the irregular sense of the real flame, creating a more realistic visual effect, and 360-degree visibility.

To be more specific, the encloser 2 is a thin shell structure with a frosted structure or fog surface effect, which can be made of plastic or rubber or silicone or glass or other materials. The material is not limited, such as PP/PET/PC plastic, and it can be made of blow molding or injection molding. In this embodiment, the frosted area of the encloser 2 is provided from the top of the encloser 2 to the bottom of the light head 1. In other embodiments, the frosted area surface of the encloser 2 can be the entire outer surface of the encloser 2. In this embodiment, the frosting of the outer surface of the encloser 2 is realized by grinding on the relevant surface of the mold, and it can also be achieved by sandblasting, filming and other treatment processes on the surface of the product. As long as the encloser 2 and the light head housing 12 meet the physical contour effect of the fuzzy light column, and can be selected according to the actual requirements.

Further refer to FIGS. 1 to 3, comprising a base 3. One end of the base 3 is provided with an inner shell 31, the inner shell 31 is provided on the inside of the encloser 2, the inner shell 31 and the light head 1 are connected by a sleeve 32, the inner shell 31 is provided with a connecting hole 311 at one end near the luminous body 11, one end of the sleeve 32 is inserted into the through hole 122, the other end of the sleeve 32 is inserted into the connecting hole 311, and one end of the wire 13 is electrically connected with the luminous body 11 by through the sleeve 32. Through the setting of the base 3, it is easy to realize the characteristics of the whole device with few components, simple structure and convenient assembly. The sleeve 32 protects the wire 13 and enables the connection between the light head 1 and the inner shell 31. One end of the sleeve 32 is inserted into the through hole 122, which can make the light source glow like the wick of a candle, so as to improve the simulation of the whole luminaire like a flame. The sleeve 32 and the through hole 122 are closely coordinated to realize the circumferential fixation of the sleeve 32 and the light head 1.

In other embodiments, the encloser 2 is a split structure, that is, the encloser 2 is divided into the first shell and the second shell near the connection of the inner shell 31 and the light head 1, and the first shell is provided above the second shell. The second shell and the inner shell 31 are fixed or removed. The first shell is flame-shaped or cylindrical or round table-shaped or curved, and its shape can be set according to actual needs. The second shell is cylindrical or round or curved, and its shape can be set according to actual needs. The first shell is made of translucent or foggy plastic or resin or glass or other materials with a frosted structure.

In other embodiments, the inner shell 31 is made of opaque plastic or rubber or other materials. The inner shell 31 can be set into different shapes according to actual needs, which can be slender tubular or thick cylindrical or other shapes to simulate the candle shape.

In other embodiments, the other end of the wire 13 is connected to a PCBA circuit board 33, the lower part of the PCBA circuit board 33 is connected with a battery compartment 34, the other end of the base 3 is provided with a bottom cover 37, and the battery compartment 34 is provided on the upper side of the bottom cover 37. The battery compartment 34 provides power for the luminous body 11, the PCBA circuit board 33 is used for controlling the light emitting and working state of the luminous body 11, and the bottom cover 37 is used to support and protect the electrical components inside the inner shell 31. Specifically, the PCBA circuit board 33 is equipped with a control module to control the luminous body 11.

In a specific embodiment, a sealing ring 35 is provided between the bottom cover 37 and the inner shell 31. The bottom cover 37 is connected with a sealing ring 35 to the inner shell 31, which can realize the internal waterproof to protect the battery compartment 34 and prolong the service life of the battery.

In this embodiment, the material of the sealing ring 35 is made of silicone. In other embodiments, the material of the sealing ring 35 can also be made of rubber or resin or other materials, as long as it meets the sealing of the bottom cover 37 and the inner shell 31.

In other embodiments, the bottom cover 37 can be matched with the inner shell 31 without a sealing ring 35, that is, it can be set according to the actual needs.

In a specific embodiment, the bottom cover 37 is provided with a switch mounting slot 361, the switch mounting slot 361 is provided with a switch 36, and the switch 36 is used for controlling the circuit of the luminous body 11 on and off. The switch 36 can slide in the switch mounting slot 361 to control the on-off of the circuit, so as to control the light-on mode and off mode of the luminous body 11.

Figure 4:
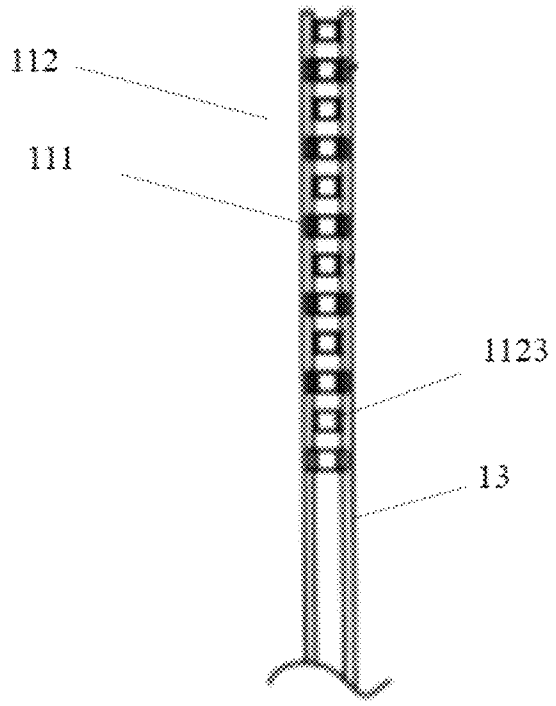
FIG. 4 is a cross-sectional view of a set of LED lamps according to an embodiment of the present application.

Please refer to FIG. 4. The luminous body 11 is provided with at least one LED light group 112, and at least one LED light bead 1123 of each group of LED light group 112 is connected in series through two wires 13.

Specifically, for a group of LED light group 112, the LED light beads 1123 on the LED light group 112 can use patch LED components, which can emit light by connecting the power supply through two wires 13. The length direction of the several LED element wires 13 is arranged, for example, it can be a triangle or a circle or an arc or other irregular shape.

In other embodiments, the number of LED light groups 112 can be one group or two groups or three groups or even more, with a variety of implementation methods.

Figure 5A:
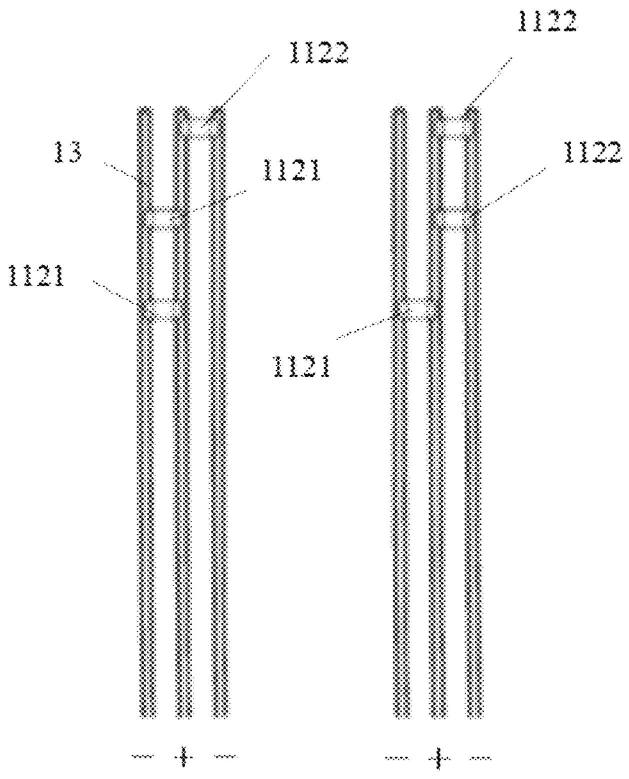
FIG. 5A is a cross-sectional view of two sets of LED light sets containing a positive electrode connected by one of the two wires according to one embodiment of the present application.
Figure 5B:
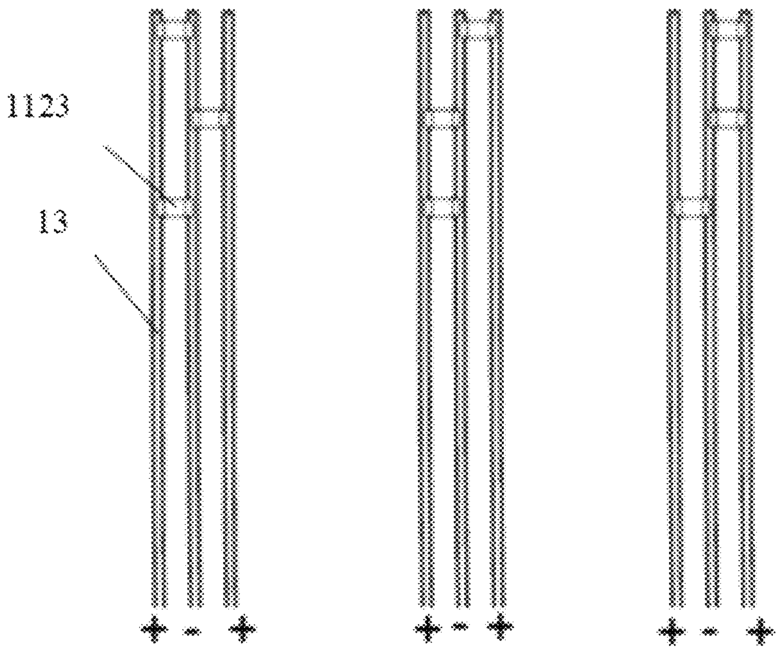
FIG. 5B is a cross-sectional view of two sets of LED lamps containing a negative electrode connected by one of the two wires according to one embodiment of the present application.

Further refer to FIGS. 5A and 5B, the LED light group 112 comprises a continuously shining LED light group 1121 and a blinking LED light group 1122, the continuously shining LED light group 1121 is provided in the lower part of the luminous body 11, and the blinking LED light group 1122 is provided in the upper part of the luminous body 11. The continuously shining LED light group 1121 is provided in the lower part of the luminous body 11 to simulate the effect of continuous combustion of the flame, and partially flashes to simulate the effect of irregular beating or swinging of the flame.

Specifically, the continuously shining LED light group 1121 comprises at least one continuously shining bead 1123, and the blinking LED light group 1122 comprises at least one blinking LED bead 1123. It should be noted that the number of continuously shining beads 1123 can be one or two or three or more, the number of blinking LED beads

1123 can be one or two or more, and the specific number of continuously shining beads 1123 and blinking LED beads 1123 can be rooted. According to the simulated fire size setting, and the beads of the continuously shining LED light group 1121 and the blinking LED light group 1122 are controlled by the control module.

In this embodiment, the luminous body 11 is provided with two LED light groups 112 arranged in parallel, the positive electrodes of the two LED light groups 112 are connected by one of the two wires 13, and the LED light beads 1123 on the two LED light groups 112 have a staggered distribution. The luminous body 11 is equipped with two sequential LED light groups 112, and the positive electrodes of LED light groups 112 are connected by one of the two wires 13. By controlling the lighting, light ratio or brightness of each LED light group 112, a variety of combinations can be freely and flexibly arranged to meet the needs of different occasions. And there is no substrate occlusion, so that the LED light beads 1123 can be illuminated at 360 degrees. Moreover, the two LED light groups 112 are arranged in parallel, that is, the positive and negative electrodes of the corresponding light group of the wire are negative-positive-negative from left to right, but the position of the LED light beads 1123 on the length of the wires on the respective LED light groups 112 can be different, resulting in the arrangement of the light beads on the two light groups is staggered.

In the specific embodiment, for two sets of LED light group 112, each set of LED light group 112 can use at least one low-power LED light bead 1123. The negative electrodes of the adjacent LED light group 112 are connected by one of the two wires 13, that is, one wire 13 is shared, including three wires 13, of which two wires 13 is connected to the positive electrodes of the two sets of LED light group 112, and the negative electrodes of the two sets of LED light group 112 are connected by another wire 13. The arrangement of LED light beads 1123 on different LED light groups 112 can be set according to the needs. For example, multiple LED light beads 1123 on the two LED light groups 112 can be staggered, that is, the position of LED light beads 1123 on different LED light groups 112 in the length direction of wire 13 can be different. The luminous body 11 can be connected to an external control module to control the operating state of each LED light group 112 through the control module. Among them, the number of LED light beads 1123 on the two sets of LED light group 112 can be different, which can be combined according to the needs. It should be understood that the two LED light groups 112 are arranged in parallel, that is, the positive and negative electrodes of the corresponding light group of the wire are positive-negative-positive from left to right, but the position of the LED light beads 1123 on the length of the wires on the respective LED light groups 112 can be different, resulting in the arrangement of the light beads on the two light groups is staggered.

Figure 6:
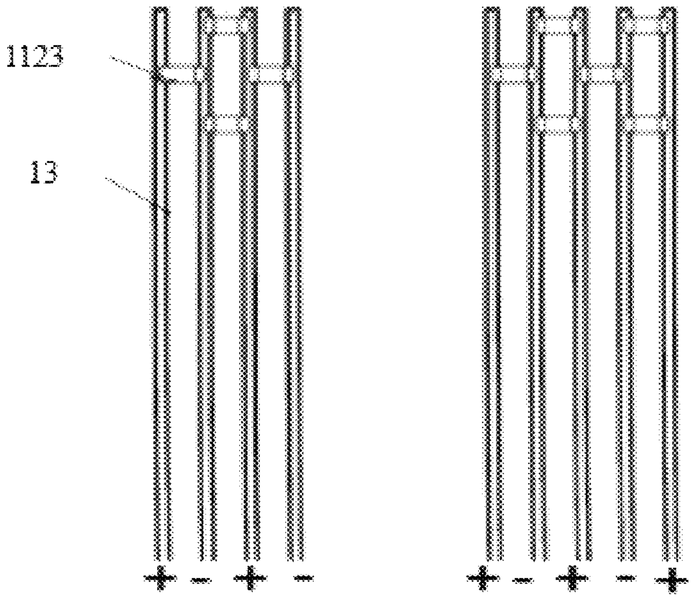
FIG. 6 is a cross-sectional view of the three and four LED lamp sets according to one embodiment of the present application.

Specifically, please refer to FIG. 6. For three sets of LED light group 112, including three sets of LED light group 112 set side by side from left to right, each set of LED light group 112 can use at least one low-power LED light bead 1123. The negative electrode of the LED light group 112 provided in the middle is connected to the negative electrode of the left LED light group 112 through the wire 13. The negative electrode is connected by the wire 13, and the positive electrode of the LED light group 112 in the middle and the positive electrode of the LED light group 112 on the right are connected by the wire 13, and the positive electrode of the LED light group 112 provided in the middle is connected to the positive electrode of the LED light group 112 on the right through the wire 13, that is, including four wires 13. The luminous body 11 can be connected to the external control module and control the work of each LED light group 112 through the control module. Make the state. Among them, the number of LED beads 1123 on the three LED light groups 112 can be different and combined according to the requirements.

In other embodiments, the number of LED light groups 112 can be four or more, which can be set according to the actual needs. Moreover, the positive or negative electrodes of the adjacent LED light groups 112 are connected by one of the two wires 13, that is, the positive and negative electrodes connected by the wires of the adjacent light groups are arranged in a symmetrical manner, and the electrodes connected by the wires on each side of the adjacent two light groups are the same electrode, and the other electrode is the common electrode of the adjacent two light groups. By increasing the number of LED light groups 112 and the wires 13, it is used to control the current of a specific LED light group 112 separately, so that it can produce flicker, brightness change and other effects. By applying different currents on the wires 13 (which can be used with various circuits), plus different LED numbers and arrangement methods, a variety of dynamic changes such as flickering/breathing can be realized. Compared with a single light source, this design is more variable and more convenient to simulate the real flame effect. Compared with the combined patch light source on the circuit board, it can save more LED lights and lower power consumption. It can also achieve 360-degree light source divergence and lower cost.

In this present disclosure, unless otherwise specified and limited, the terms “installation”, “connection”, “fixing”, etc, should be interpreted broadly. For example, they can be fixedly connected or detachably connected, or integrated; they can be mechanically connected or electrically connected; they can be directly connected or indirectly connected through an intermediate medium, and can be the interconnection within two components or the interaction between two components, unless otherwise specified. For ordinary technicians in this field, they can understand the specific meanings of the above terms in this present disclosure according to specific circumstances.

In the description of this specification, the first feature “up” or “down” is the first and second features, or the first and second features are indirectly contacted through an intermediate medium. Moreover, the first feature is “above” the second feature, but the first feature is directly above or above the second feature, or merely means that the high-level height of the first feature is higher than that of the second feature. The first feature “below” the second feature can be mean that the first feature is direct below or diagonally below the second feature, or simply indicate that the first feature level is less horizontal than that of the second feature. Moreover, the terms “first”, “second” are used only for descriptive purposes and cannot be understood as indicating or implying relative importance or implicitly indicating the number of technical characteristics indicated. Thus, the first or second may explicitly or implicitly comprise at least one of the features.

In the description of this specification, the reference terms “one embodiment”, “some embodiment”, “examples”, “specific examples”, or “some examples”, etc, refer to the specific features, structures, materials, or characteristics incorporated in the embodiment or description of the example contained in at least one embodiment or example of the present disclosure. In this specification, schematic representations of the above terms must not be directed to identical embodiments or examples. Further, the specific features, structures, materials or features described may be combined in a suitable manner in any one or more embodiments or examples. In addition, without contradicting each other, persons skilled in the art may combine and combine the different embodiments or examples described in this specification and the characteristics of different embodiments or examples.

It is clear that those skilled in the art may make various modifications and changes to the embodiments of this application without departing from the spirit and scope of this application. In this way, if these modifications and alterations fall within the scope of the claims of the present application and their equivalents, the present application is also intended to cover these modifications and alterations. The word "comprise" does not preclude the existence of other elements or steps not listed in the claim. The simple fact that certain measures are recorded in mutually different dependent claims does not indicate that a combination of these measures could not be used to make a profit. Any pictorial marks in the claims shall not be considered to limit the scope.

The invention claimed is:

1. An artificial flame luminaire, comprising a light head, wherein an encloser is provided around the light head, the encloser has a top end being equal or higher than a top end of the light head from a horizontal perspective, the light head comprises a luminous body and a light head housing, the light head housing is provided to form an outer surface of the light head, the light head housing is provided with a chamber inside, the luminous body is installed in the chamber, there is a gap between the encloser and the light head, the encloser and the light head housing cooperate to filter light from the luminous body, and the encloser is made of a light transmission material with translucent frosted or partial translucent frosted or with fog surface effect or partial fog surface effect.

2. The artificial flame luminaire according to claim 1, wherein the light head housing is made of silicone or plastic material, and the light head housing has a light transmittance between 20% and 50% for visible light with a wavelength of 400 nm to 800 nm.

3. The artificial flame luminaire according to claim 1, wherein a translucent frosted or fog surface area of the encloser has a light transmittance between 40% and 80% for visible light with a wavelength of 400 nm-800 nm.

4. The artificial flame luminaire according to claim 1, wherein the light head housing has a single layer structure by integrally-forming, and the bottom of the light head is provided with a through hole communicated with the chamber.

5. The artificial flame luminaire according to claim 4, wherein the luminous body is provided with at least one LED light group, and at least one LED light bead of each group of LED light group is connected in series through two wires.

6. The artificial flame luminaire according to claim 5, wherein the LED light group comprises a continuously shining LED light group and a blinking LED light group, the continuously shining LED light group is provided in the lower part of the luminous body, and the blinking LED light group is provided in the upper part of the luminous body.

7. The artificial flame luminaire according to claim 5, wherein the luminous body is provided with two LED light groups arranged in parallel, the positive electrodes of the two LED light groups are connected by one of the two wires, and the LED light beads on the two LED light groups have a staggered distribution.

8. The artificial flame luminaire according to claim 5, wherein the luminous body is provided with two LED light groups arranged in parallel, the negative electrodes of the two LED light groups are connected by one of the two wires, and the LED light beads on the two LED light groups have a staggered distribution.

9. The artificial flame luminaire according to claim 5, wherein the luminous body is provided with at least two LED light groups, each of the LED lamp groups is provided with at least one series of the LED light beads, the positive or negative electrodes of the adjacent LED light groups are connected by one of the two wires.

10. The artificial flame luminaire according to claim 5, wherein further comprising a base, one end of the base is provided with an inner shell, the inner shell is provided on the inside of the encloser, the inner shell and the light head are connected by a sleeve, the inner shell is provided with a connecting hole at one end near the luminous body, one end of the sleeve is inserted into the through hole, the other end of the sleeve is inserted into the connecting hole, and one end of the wire is electrically connected with the luminous body by through the sleeve.

11. The artificial flame luminaire according to claim 10, wherein the other end of the wire is connected to a PCBA circuit board, the lower part of the PCBA circuit board is connected with a battery compartment, the other end of the base is provided with a bottom cover, and the battery compartment is provided on the upper side of the bottom cover.

12. The artificial flame luminaire according to claim 11, wherein a sealing ring is provided between the bottom cover and the inner shell.

13. The artificial flame luminaire according to claim 12, wherein the bottom cover is provided with a switch mounting slot, the switch mounting slot is provided with a switch, and the switch is configured to control the circuit of the luminous body on and off.

14. The artificial flame luminaire according to claim 1, wherein the outer surface of the luminous body is provided with a scattering layer, and the scattering layer cooperates with the luminous body to filter light.

15. The artificial flame luminaire according to claim 1, wherein the top end of the encloser is provided with a cover, and the cover is sealed with the encloser.

16. The artificial flame luminaire according to claim 1, wherein the top end of the encloser has an open structure.

17. The artificial flame luminaire according to claim 1, wherein the encloser is flame-shaped or cylindrical or round-table-like, and is made of plastic or silicone or glass.

* * * * *